(12) United States Patent
Kobayashi et al.

(10) Patent No.: US 9,746,368 B2
(45) Date of Patent: Aug. 29, 2017

(54) COMMUNICATION LIGHT DETECTION ADAPTER AND LIGHT COMMUNICATION DETECTION STRUCTURE FOR CHECKING AN OPTICAL COMMUNICATION LINE

(71) Applicant: Hitachi Metals, Ltd., Tokyo (JP)

(72) Inventors: Takumi Kobayashi, Hitachi (JP); Koki Hirano, Hitachinaka (JP); Kanako Suzuki, Hitachi (JP); Mikio Okoshi, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 90 days.

(21) Appl. No.: 14/626,257

(22) Filed: Feb. 19, 2015

(65) Prior Publication Data

US 2015/0253183 A1   Sep. 10, 2015

(30) Foreign Application Priority Data

Mar. 4, 2014   (JP) ................. 2014-041652

(51) Int. Cl.
| | |
|---|---|
| *G01J 1/02* | (2006.01) |
| *G01J 1/04* | (2006.01) |
| G02B 6/28 | (2006.01) |
| G02B 6/38 | (2006.01) |
| H04B 10/079 | (2013.01) |
| G02B 6/42 | (2006.01) |

(52) U.S. Cl.
CPC ........... *G01J 1/0271* (2013.01); *G01J 1/0403* (2013.01); *G02B 6/2852* (2013.01); *G02B 6/3825* (2013.01); *G02B 6/4201* (2013.01); *H04B 10/0795* (2013.01)

(58) Field of Classification Search
CPC .. G02B 6/2852; G02B 6/3825; G02B 6/4201; G02B 6/4214; G02B 6/4219
See application file for complete search history.

(56) References Cited

U.S. PATENT DOCUMENTS

| | | | | |
|---|---|---|---|---|
| 2007/0206163 A1* | 9/2007 | Kuroda | ............... | G03B 21/145 353/88 |
| 2010/0008676 A1 | 1/2010 | Kojima et al. | | |
| 2010/0329604 A1* | 12/2010 | Kojima | ............... | G02B 6/2852 385/31 |

FOREIGN PATENT DOCUMENTS

| | | |
|---|---|---|
| JP | S36-005234 | 3/1961 |
| JP | H09-320230 A | 12/1997 |
| JP | 2009-145676 | 7/2009 |
| JP | 2011-013360 | 1/2011 |
| JP | 2013-228678 | 11/2013 |
| WO | 2012-026017 A1 | 3/2012 |

OTHER PUBLICATIONS

Japanese Application 2014-041652 Office Action dated Jan. 24, 2017 and English translation thereof.

* cited by examiner

*Primary Examiner* — Francis M Legasse, Jr.
(74) *Attorney, Agent, or Firm* — Roberts Mlotkowski Safran Cole & Calderon P.C.

(57) ABSTRACT

A communication light detection adapter includes an adapter main body in which a light extraction hole is formed, a sliding lid attached to the adapter main body so as to slide between a closed position to close the light extraction hole and an open position to open the light extraction hole, and an energizing member to apply a pressure to the sliding lid in a direction from the open position toward the closed position.

10 Claims, 11 Drawing Sheets

US 9,746,368 B2

COMMUNICATION LIGHT DETECTION ADAPTER AND LIGHT COMMUNICATION DETECTION STRUCTURE FOR CHECKING AN OPTICAL COMMUNICATION LINE

The present application is based on Japanese patent application No. 2014-041652 filed on Mar. 4, 2014, the entire contents of which are incorporated herein by reference.

BACKGROUND OF THE INVENTION

1. Field of the Invention

The invention relates to a communication light detection adapter and a communication light detection structure that are adapted to visually check a used/unused state of optical transmission line by detecting a communication light.

2. Description of the Related Art

Optical communication-related equipment uses a communication light detection technique which is adapted to check a used/unused state (hereinafter, referred to as "communication state") of an optical transmission line by detecting a communication light in an invisible light range so as to monitor the steadiness of the optical transmission line or to prevent a man-caused erroneous removal of connector.

As an example of the communication light detection technique, a communication light detection structure is known which is adapted to extract as a leak light a portion of communication light transmitting through the optical transmission line, to receive the leak light by a light-receiving element, to thereby detect whether the communication light is transmitted through the optical transmission line or not, and to output the communication state of the optical transmission line so as to allow the operator's visual check (see e.g. JP-A-2009-145676, JP-A-2010-231082, JP-A-2011-013359 and JP-A-2011-013360).

The communication light detection structure is provided with a communication light detection adapter 1600 having an adapter main body 102 and a rotating lid member 1601, as shown in FIGS. 16 and 17. The adapter main body 102 has a light extraction hole 101 for extracting leak light toward the light-receiving element. The rotating lid member 1601 is attached to a shaft 116 formed on the adapter main body 102 so as to be rotatable around the shaft 116 as a pivot point between a closed position to close the light extraction hole 101 and an open position to open the light extraction hole 101.

The rotating lid member 1601 is at the closed position to keep the light extraction hole 101 closed except when checking the communication state of the optical transmission line so as to prevent a foreign body such as a dust from entering the light extraction hole 101.

SUMMARY OF THE INVENTION

In checking the communication state of the optical transmission line by using the communication light detection adapter 1600, an operator manually can rotate the rotating lid member 1601 to the open position by pressing down a knob portion 1602 of the rotating lid member 1601 in order to open the light extraction hole 101, attach a communication light detector to the communication light detection adapter 1600 so that a light-receiving element is fit to the light extraction hole 101, detach the communication light detector from the communication light detection adapter 1600 after checking the communication state of the optical transmission line, and again manually rotates the rotating lid member 1601 to the closed position to close the light extraction hole 101.

Thus, in using the communication light detection adapter 1600, the operation sequence for checking the communication state of the optical transmission line is complicated and time consuming. In addition, a foreign body may enter the light extraction hole 101 due to a human error that the operator forgets to return the rotating lid member 1601 back to the closed position after checking the communication state of the optical transmission line.

It is an object of the invention to provide a communication light detection adapter and a communication light detection structure that allow the simplification of the operation sequence for checking the communication state of the optical transmission line and prevents the entrance of the foreign body into the light extraction hole due to the human error.

(1) A communication light detection adapter comprises:
an adapter main body in which a light extraction hole is formed;
a sliding lid attached to the adapter main body so as to slide between a closed position to close the light extraction hole and an open position to open the light extraction hole; and
an energizing member to apply a pressure to the sliding lid in a direction from the open position toward the closed position.

In the above embodiment (1) of the invention, the following modifications and changes can be made.

(i) The adapter main body comprises a rectangular parallelepiped shape in which the light extraction hole is formed on an upper surface thereof, and wherein the sliding lid comprises a lid portion and a housing portion, wherein the lid portion is arranged in contact with the upper surface of the adapter main body to close or open the light extraction hole, and wherein the housing portion is arranged on a side surface of the adapter main body with a gap therebetween and housing the energizing member.

(ii) The sliding lid further comprises a horizontal rattling prevention portion formed on an inner surface of the housing portion and in contact with the side surface of the adapter main body to keep the gap constant.

(iii) The sliding lid comprises a vertical rattling prevention portion for maintaining contact between the lid portion and the upper surface of the adapter main body.

(iv) The sliding lid comprises a long-hole portion extending along a sliding direction, and wherein the adapter main body comprises a shaft to be engaged with the long-hole portion.

(v) The energizing member comprises a coil formed by helically bending a wire rod and a pair of arms comprising both ends of the wire rod.

(2) According to another embodiment of the invention, a communication light detection structure comprises:
a communication light detection adapter; and
a communication light detector removably attached to the communication light detection adapter,
wherein the communication light detection adapter comprises an adapter main body in which a light extraction hole is formed, a sliding lid attached to the adapter main body so as to slide between a closed position to close the light extraction hole and an open position to open the light extraction hole, and an energizing member to apply a pressure to the sliding lid in a direction from the open position toward the closed position, and
wherein the communication light detector comprises a detector main body comprising a light-receiving element to be housed in the light extraction hole and a pressing leg formed on the detector main body to press the sliding lid from the closed position toward the open position when housing the light-receiving element in the light extraction hole.

In the above embodiment (2) of the invention, the following modifications and changes can be made.

(vi) The communication light detector further comprises a guide leg formed on the detector main body to align the light-receiving element with respect to the light extraction hole when housing the light-receiving element in the light extraction hole, and the communication light detection adapter further comprises a guide portion for receiving the guide leg.

(vii) The guide leg is longer than the pressing leg.

(viii) The adapter main body comprises a pair of divided portions, wherein the guide portion is provided on one of the divided portions, and wherein the sliding lid is provided on another of the divided portions.

(ix) The communication light detector further comprises a clearance groove formed on the detector main body to avoid mechanical interference between the communication light detector and other communication light detection adapters when attaching the communication light detector to the communication light detection adapter.

(x) The sliding lid comprises a receiving portion for receiving the pressing leg.

(xi) The pressing leg and/or the receiving portion comprises an inclined portion to slide the sliding lid from the closed position toward the open position when the receiving portion receives the pressing leg.

Effects of the Invention

According to one embodiment of the invention, a communication light detection adapter and a communication light detection structure can be provided that allow the simplification of the operation sequence for checking the communication state of the optical transmission line and prevents the entrance of the foreign body into the light extraction hole due to the human error.

BRIEF DESCRIPTION OF THE DRAWINGS

Next, the present invention will be explained in more detail in conjunction with appended drawings, wherein.

DETAILED DESCRIPTION OF THE PREFERRED EMBODIMENT

A preferred embodiment of the invention will be described below in conjunction with the appended drawings.

Firstly, a communication light detection adapter in the preferred embodiment of the invention will be described.

Figure 1:
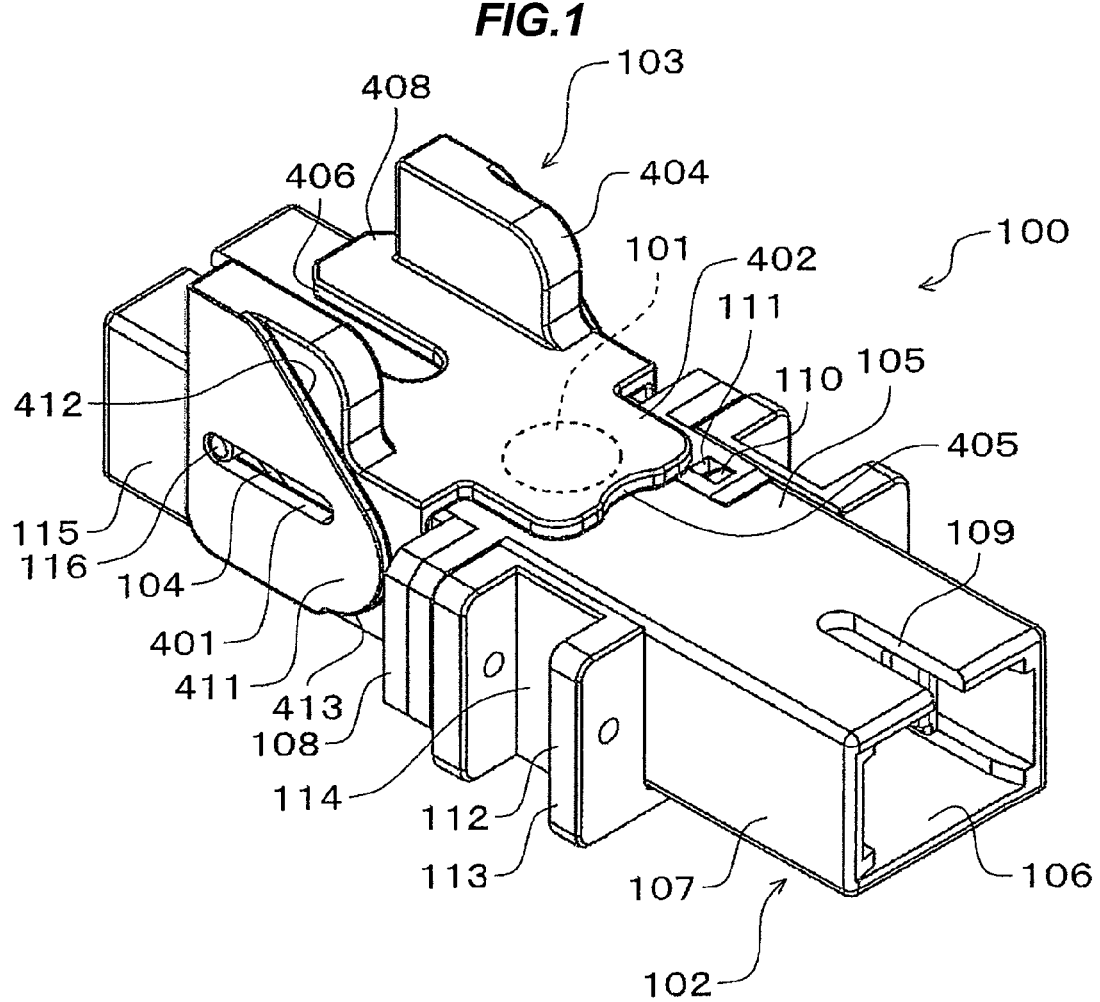
FIG. 1 is a perspective view showing a communication light detection adapter of the present invention in a state that a sliding lid is arranged at a closed position.
Figure 2:
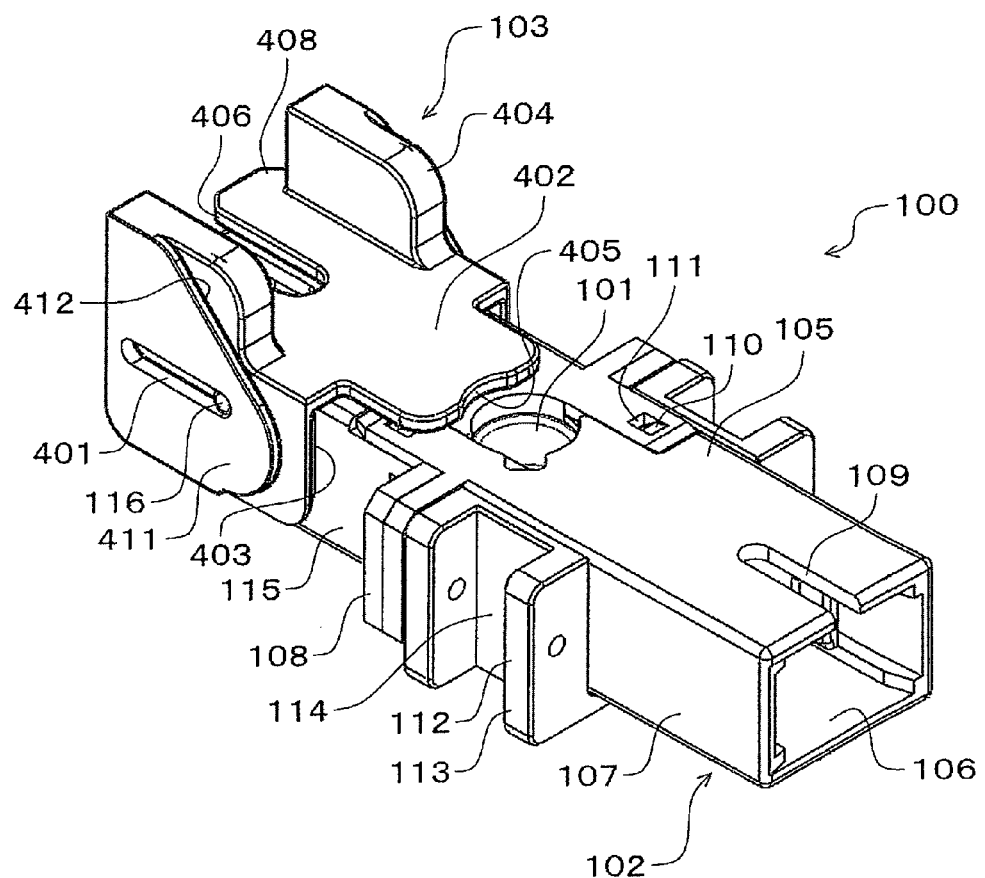
FIG. 2 is a perspective view showing the communication light detection adapter of the invention in a state that the sliding lid is arranged at an open position.

As shown in FIGS. 1 and 2, a communication light detection adapter 100 in the preferred embodiment of the invention is provided with an adapter main body 102 having a light extraction hole 101, a sliding lid 103 attached to the adapter main body 102 so as to be slidable between a closed position to close the light extraction hole 101 and an open position to open the light extraction hole 101, and an energizing member 104 for applying a force to press the sliding lid 103 from the open position toward the closed position.

Here, FIG. 1 shows the communication light detection adapter 100 in a state that the sliding lid 103 is arranged at the closed position and FIG. 2 shows the communication light detection adapter 100 in a state that the sliding lid 103 is arranged at the open position.

The communication light detection adapter 100 connects between connectors inserted into end portions of the adapter main body 102 and has a function of extracting leak light toward a light-receiving element 1102 (described later) through the light extraction hole 101 when a communication light detector 1101 (described later) is attached to the communication light detection adapter 100.

Figure 3:
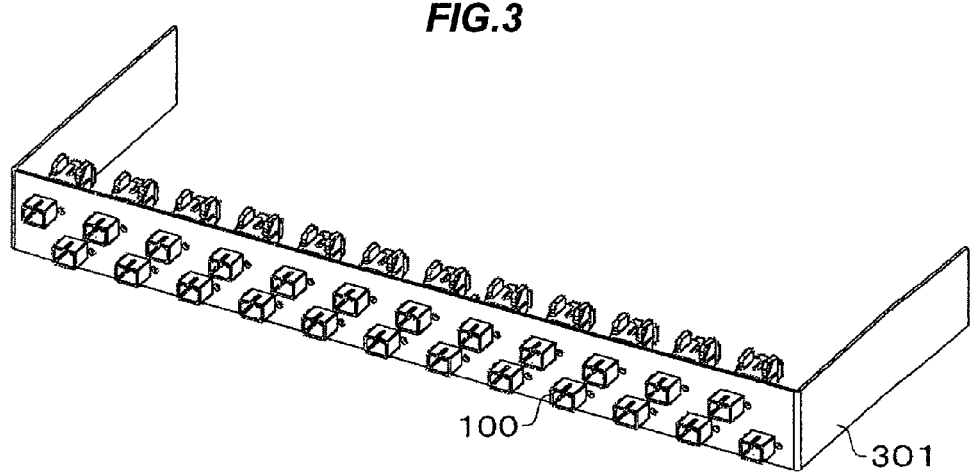
FIG. 3 is a perspective view showing the multiple communication light detection adapters of the invention which are mounted on a rack panel.

For example, plural communication light detection adapters 100, each of which is constructed from a SC adapter used for connecting SC connectors to each other, are mounted on a rack panel 301 used in an optical communication-related equipment as shown in FIG. 3.

Referring back to FIGS. 1 and 2, the light extraction hole 101 houses the light-receiving element 1102 so that light other than leak light is blocked to prevent the light-receiving element 1102 from receiving light other than the leak light and the communication state of the optical transmission line from being checked incorrectly. Also, the light extraction hole 101 has a function of extracting the leak light toward the light-receiving element 1102 during when the communication light detector 1101 is attached to the communication light detection adapter 100.

The leak light here means light which is a portion of communication light transmitting through an optical transmission line and is extracted to the outside of the optical transmission line through a light extraction portion formed in the midway of the optical transmission line.

As the light extraction portion, it is possible to use a known structure, e.g., a light detecting groove disclosed in JP-A-2009-145676, JP-A-2010-231082 and JP-A-2011-013359 or an off-axis portion disclosed in JP-A-2013-228678 but the detailed description thereof will be omitted herein.

The adapter main body 102 has a rectangular parallelepiped shape with the light extraction hole 101 on an upper surface 105. Two divided portions 107 each having an insertion-fit hole 106 for inserting and fitting a connector are coupled to each other via flange portions 108, thereby forming the adapter main body 102.

Here, forming the adapter main body 102 by coupling two divided portions 107 having different shapes of the insertion-fit holes 106 allows the communication light detection adapter 100 to connect different types of connectors to each other.

The insertion-fit hole 106 is formed in a shape matching a specific type of connector and has a first groove 109 for receiving, e.g., an upper/bottom surface identifying protrusion which is formed on the upper surface of a connector to facilitate identification of the upper or bottom surface of the connector.

In order to reliably couple one divided portion 107 to another divided portion 107, each divided portion 107 is formed in a shape which allows two divided portions 107 to be coupled only by fitting in an appropriate direction.

In addition, in order to easily couple one divided portion 107 to another divided portion 107, each divided portion 107 has an engaging portion 111 to be engaged with a pawl portion 110 of another divided portion 107 and a pawl portion 110 to be engaged with an engaging portion 111 of the other divided portion 107.

Furthermore, each adapter main body 102 is mounted on the rack panel 301 via a spacer 112 so that the length of the adapter main body 102 exposed on the front side of the rack panel 301 is uniform regardless of types of the divided portions 107 used to form the adapter main body 102.

The spacer 112 has a pair of integrally formed wall portions 113 with a predetermined space therebetween. One of the wall portions 113 is coupled to the flange portion 108 of the divided portion 107 by a fastening member such as screw and the other wall portion 113 is coupled to the rack panel 301 by a fastening member such as screw.

A guide portion 114 for receiving a guide leg 1107 (described later) is formed between the pair of wall portions 113. The guide portion 114 has about the same width as the guide leg 1107 to prevent the rattling when the guide leg 1107 is inserted into the guide portion 114.

The adapter main body 102 also has the shaft 116 formed on a side surface 115. In the conventional communication light detection adapter 1600, the shaft 116 is used as a pivot point to rotatably support the rotating lid member 1601. In the communication light detection adapter 100 of the preferred embodiment of the invention, the rotating lid member 1601 is detached from the shaft 116, and then, the shaft 116 can be used as-is as a sliding shaft to slidably support the sliding lid 103.

Figure 4:
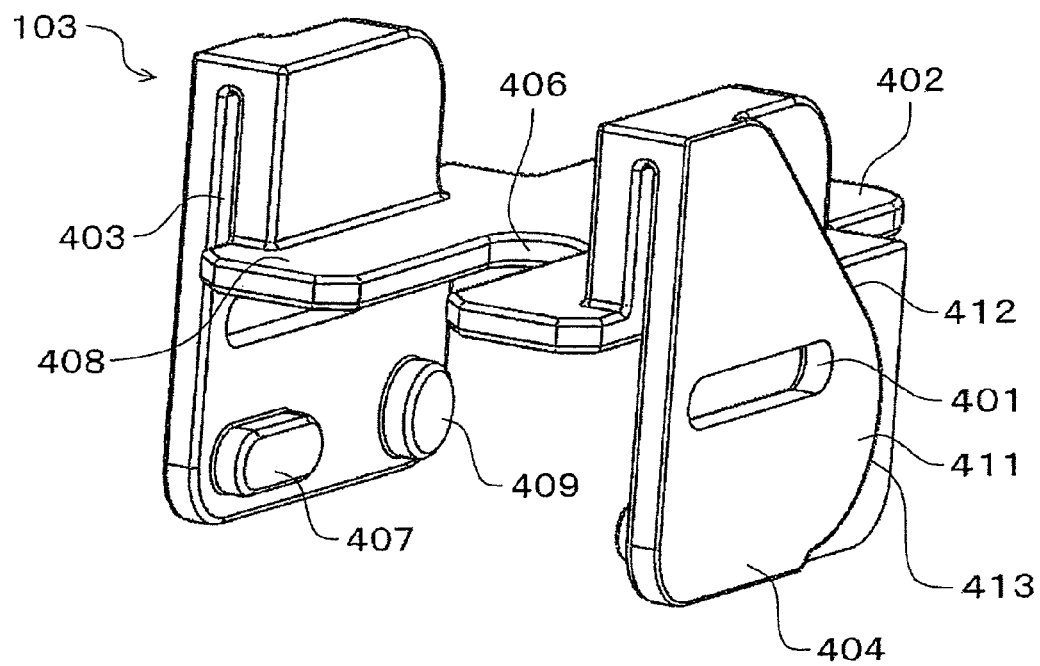
FIG. 4 is a perspective view showing the sliding lid of the communication light detection adapter of the invention as viewed from diagonally above.
Figure 5:
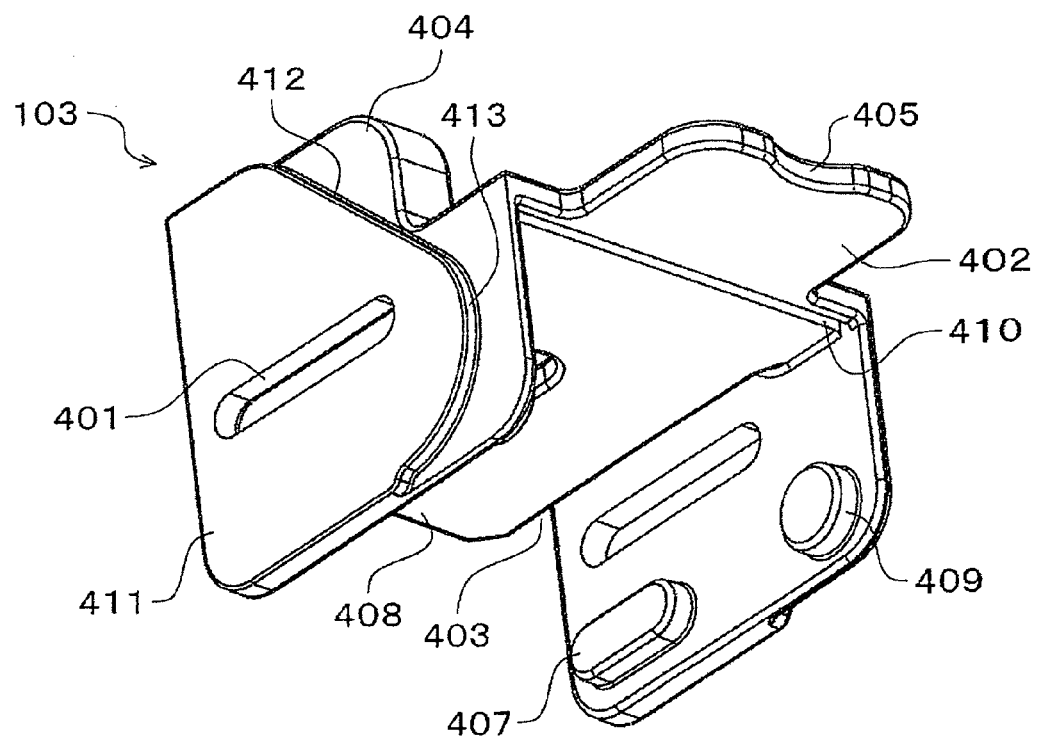
FIG. 5 is a perspective view showing the sliding lid of the communication light detection adapter of the invention as viewed from diagonally below.

As shown in FIGS. 4 and 5, the sliding lid 103 has long-hole portions 401 extending along a sliding direction. The sliding lid 103 is attached to the adapter main body 102 by engaging the long-hole portions 401 with the shaft 116.

The long-hole portion 401 is formed in such a size that a minor axis is about the same as the outer diameter of the shaft 116 and a major axis is greater than the outer diameter of the shaft 116. Thus, the sliding lid 103 is arranged slidable in a specific direction, i.e., slidable only in a major axis direction of the long-hole portion 401.

In addition, the sliding lid 103 has a lid portion 402 and a housing portion 404. The lid portion 402 is arranged in contact with the upper surface 105 of the adapter main body 102 to close or open the light extraction hole 101. The housing portion 404 is arranged on the side surface 115 of the adapter main body 102 with a gap 403 therebetween and houses the energizing member 104.

The lid portion 402 has a cut-out portion 405 formed by cutting in an arc shape along the shape of the light extraction hole 101 to avoid mechanical interference between the light-receiving element 1102 to be housed in the light extraction hole 101 and the lid portion 402 at the time of attaching the communication light detector 1101 to the communication light detection adapter 100.

The lid portion 402 also has a second groove 406 formed in the same shape as the first groove 109 to avoid mechanical interference between the upper/bottom surface identifying protrusion formed on the upper surface of the connector and the lid portion 402 at the time of inserting and fitting the connector into the adapter main body 102.

The housing portion 404 is formed at right and left edges of the lid portion 402 in an integrated manner. In addition, the housing portion 404 has a shape protruding all over the movable range of the energizing member 104 so that a movement of the energizing member 104 housed in the housing portion 404 is not interrupted when the sliding lid 103 is slid from the closed position to the open position. Furthermore, the gap 403 formed between the housing portion 404 and the side surface 115 of the adapter main body 102 also has such a width that the movement of the energizing member 104 is not interrupted.

The sliding lid 103 is further provided with horizontal rattling prevention portions 407 formed on an inner surface of the housing portion 404 and in contact with the side surface 115 of the adapter main body 102 to keep the gap 403 constant, a vertical rattling prevention portion 408 for maintaining contact between the lid portion 402 and the upper surface 105 of the adapter main body 102, a fixing portion 409 for fixing a portion of the energizing member 104 and a fixing groove 410 for fixing another portion of the energizing member 104.

The horizontal rattling prevention portion 407 and the fixing portion 409 are each constructed from a raised portion and have about the same height to prevent the housing portion 404 from rattling in the horizontal direction or to prevent the rattling from interrupting the movement of the energizing member 104.

The vertical rattling prevention portion 408, which is provided on the open position side with respect to the shaft 116 so as to be in contact with the upper surface 105 of the adapter main body 102, has functions of preventing the sliding lid 103 from rotating around the shaft 116 acting as a pivot point when the sliding lid 103 is arranged at the closed position and also preventing the lid portion 402 from being lifted up from the upper surface 105 of the adapter main body 102 and thus preventing a foreign body from entering the light extraction hole 101 through a gap between the lifted-up lid portion 402 and the upper surface 105.

Figure 6:
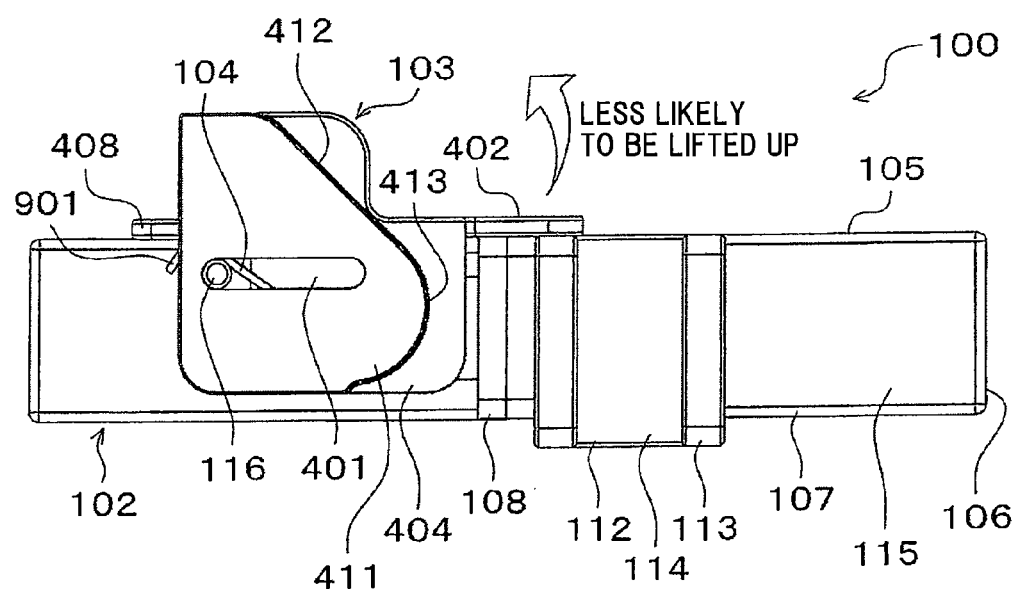
FIG. 6 is a side view showing the communication light detection adapter of the invention to explain a function of a vertical rattling prevention portion.

In detail, when the sliding lid 103 is arranged at the closed position as shown in FIG. 6, the shaft 116 is located close to an edge of the sliding lid 103 on the open position side and the lid portion 402 closing the light extraction hole 101 is likely to vertically rattle. However, forming the vertical rattling prevention portion 408 by extending the lid portion 402 in contact with the upper surface 105 of the adapter main body 102 toward the open position avoids the shaft 116 from being located close to the edge of the sliding lid 103 on the open position side and thus allows the lift-up of the lid portion 402 to be suppressed.

Furthermore, the sliding lid 103 has receiving portions 411 for receiving pressing legs 1104 (described later). The receiving portion 411 has an inclined portion 412 to slide the sliding lid 103 from the closed position toward the open position when receiving the pressing leg 1104, and an arcuate portion 413 formed continuous with the inclined portion 412.

The inclined portion 412 has a function of converting a vertical movement of the pressing leg 1104 into a movement of the sliding lid 103 in the sliding direction. The arcuate portion 413 reduces a contact area between the pressing leg 1104 and the receiving portion 411 and thereby has a function of reducing a friction between the pressing leg 1104 and the receiving portion 411 so that the sliding lid 103 is easily slid by the pressing leg 1104.

Figure 7:
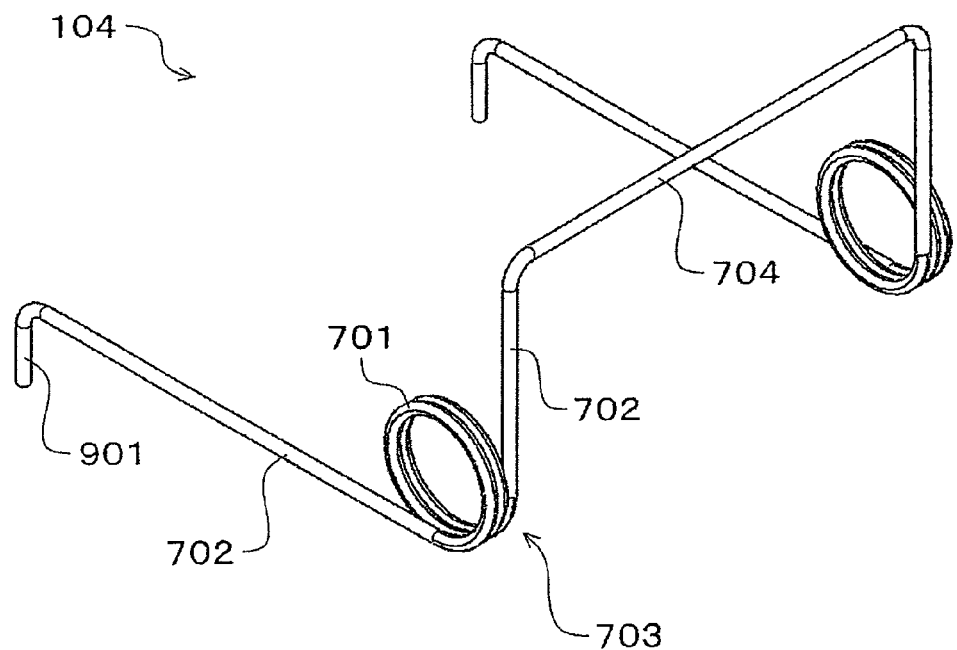
FIG. 7 is a perspective view showing an energizing member of the communication light detection adapter of the invention.

As shown in FIG. 7, the energizing member 104 has a pair of torsion coil springs (torsion springs) 703 each of which is composed of a coil 701 formed by helically bending a wire rod and a pair of arms 702 formed of the both ends of the wire rod.

The torsion coil spring 703 is configured that an angle between the pair of arms 702 is changed by a reaction force of bending stress applied to the coil 701. The arm 702 of one of the torsion coil springs 703 and the arm 702 of the other torsion coil spring 703 are coupled to each other via a coupling portion 704, thereby forming a double torsion spring.

The energizing member 104 can be manufactured by bending one wire rod.

Figure 8:
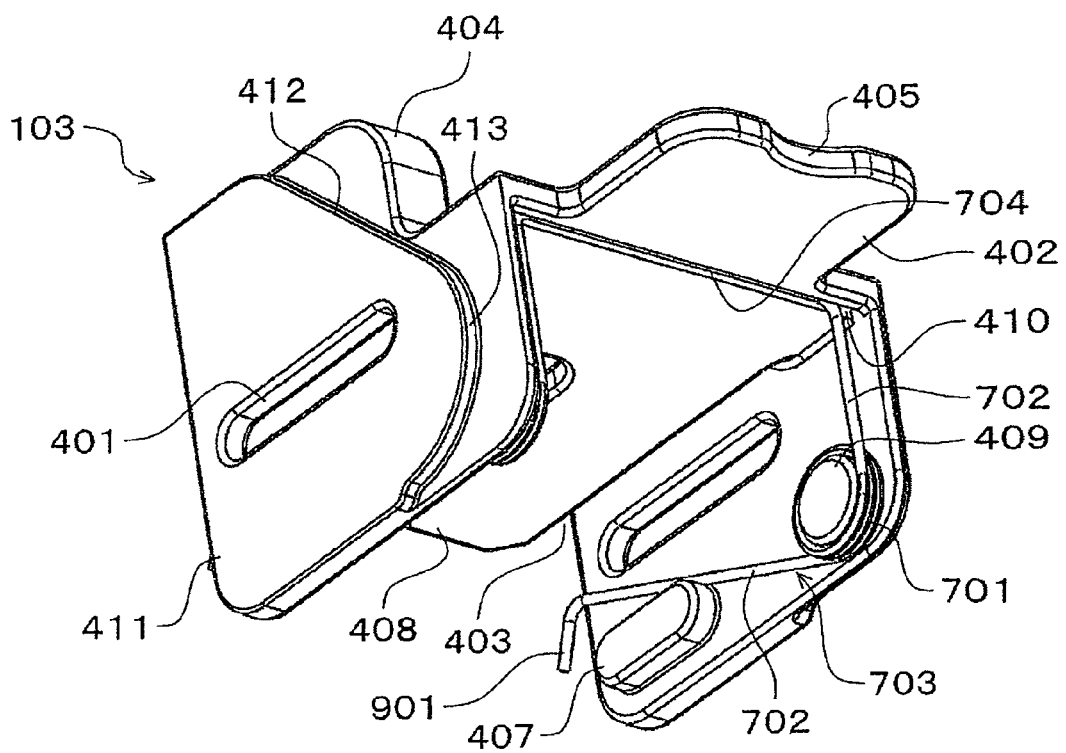
FIG. 8 is a perspective view showing the sliding lid of the communication light detection adapter of the invention to which the energizing member is attached.

As shown in FIG. 8, the coils 701 are fixed to the fixing portions 409 of the sliding lid 103 and the coupling portion 704 is housed in the fixing groove 410, and the energizing member 104 is thereby fixed to the sliding lid 103. Thus, the arms 702 not coupled to the coupling portion 704 are movably arranged inside the housing portion 404.

Figure 9:
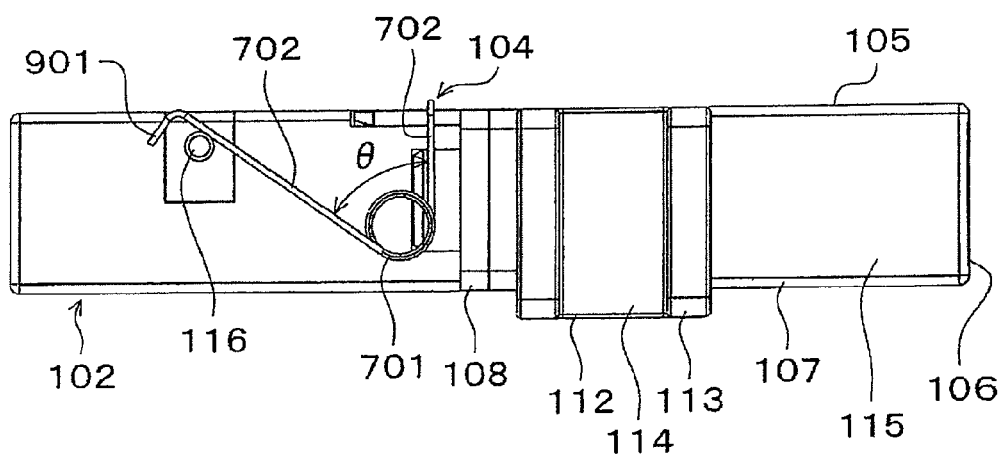
FIG. 9 is a side view showing the communication light detection adapter of the invention in a state that the sliding lid is arranged at the closed position.

As shown in FIG. 9, the sliding lid 103 with the energizing member 104 fixed thereto is attached to the adapter main body 102 so that the arms 702 not coupled to the coupling portion 704 are in contact with an upper portion of the shaft 116.

In addition, each of the arms 702 not coupled to the coupling portion 704 has a bent portion 901 formed by bending a tip portion. The bent portion 901 has a function of catching the shaft 116 when the arm 702 not coupled to the coupling portion 704 is about to come off from the shaft 116, thereby preventing the arm 702 not coupled to the coupling portion 704 from coming off from the shaft 116.

Figure 10:
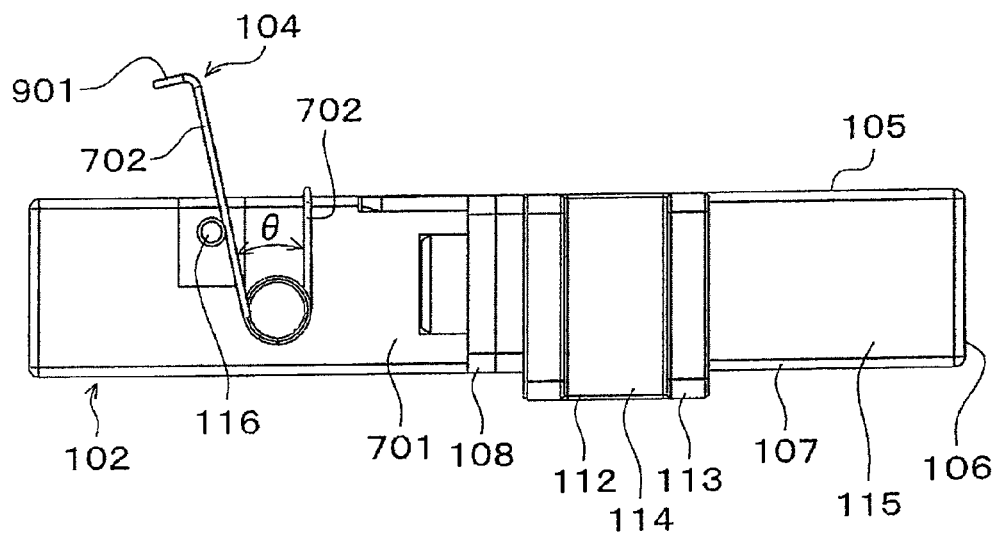
FIG. 10 is a side view showing the communication light detection adapter of the invention in a state that the sliding lid is arranged at the open position.

Due to these functions, when the sliding lid 103 is slid from the closed position to the open position, the arms 702 not coupled to the coupling portion 704 are flipped up above the shaft 116 causing a decrease in an angle θ formed between the pair of arms 702 as shown in FIG. 10, bending stress is applied to the coil 701, the reaction force of the bending stress acts in a direction of increasing the angle formed between the pair of arms 702, and a force is applied to press the sliding lid 103 from the open position toward the closed position.

In FIGS. 9 and 10, the illustration of the sliding lid 103 is omitted for the purpose of the explanation.

As described above, in the communication light detection adapter 100 of the preferred embodiment of the invention, since the energizing member 104 applies a force to press the sliding lid 103 from the open position toward the closed position, the sliding lid 103 is automatically arranged at the closed position by the energizing member 104 and closes the light extraction hole 101 without requiring a worker to manually arrange the sliding lid 103 to the closed position after checking the communication state of the optical transmission line. Thus, the work sequence for checking the communication state of the optical transmission line is simplified and entrance of foreign bodies into the light extraction hole 101 due to a human error can be also prevented.

In addition, in the communication light detection adapter 100 of the preferred embodiment of the invention, since the sliding lid 103 slides on the upper surface 105 of the adapter main body 102, the light-receiving element is fitted and attached to an opening of the light extraction hole 101 substantially simultaneously with the timing of arranging the sliding lid 103 at the open position. Therefore, there is a small chance that a foreign body attached to the upper surface of the sliding lid 103 falls in the light extraction hole 101 and it is therefore possible to effectively protect the light extraction hole 101 from entrance of the foreign body.

Next, a communication light detection structure in the preferred embodiment of the invention will be described.

Figure 11:
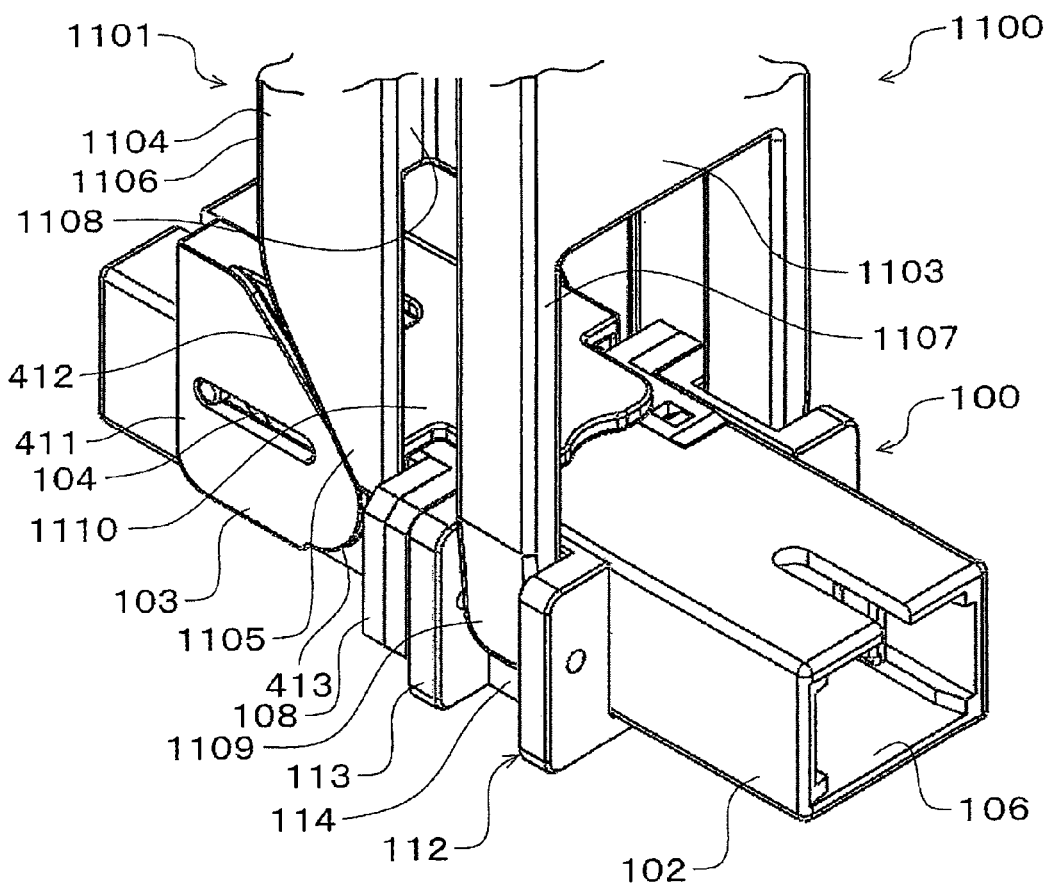
FIG. 11 is a perspective view showing a communication light detection structure of the invention before attaching a communication light detector.
Figure 12:
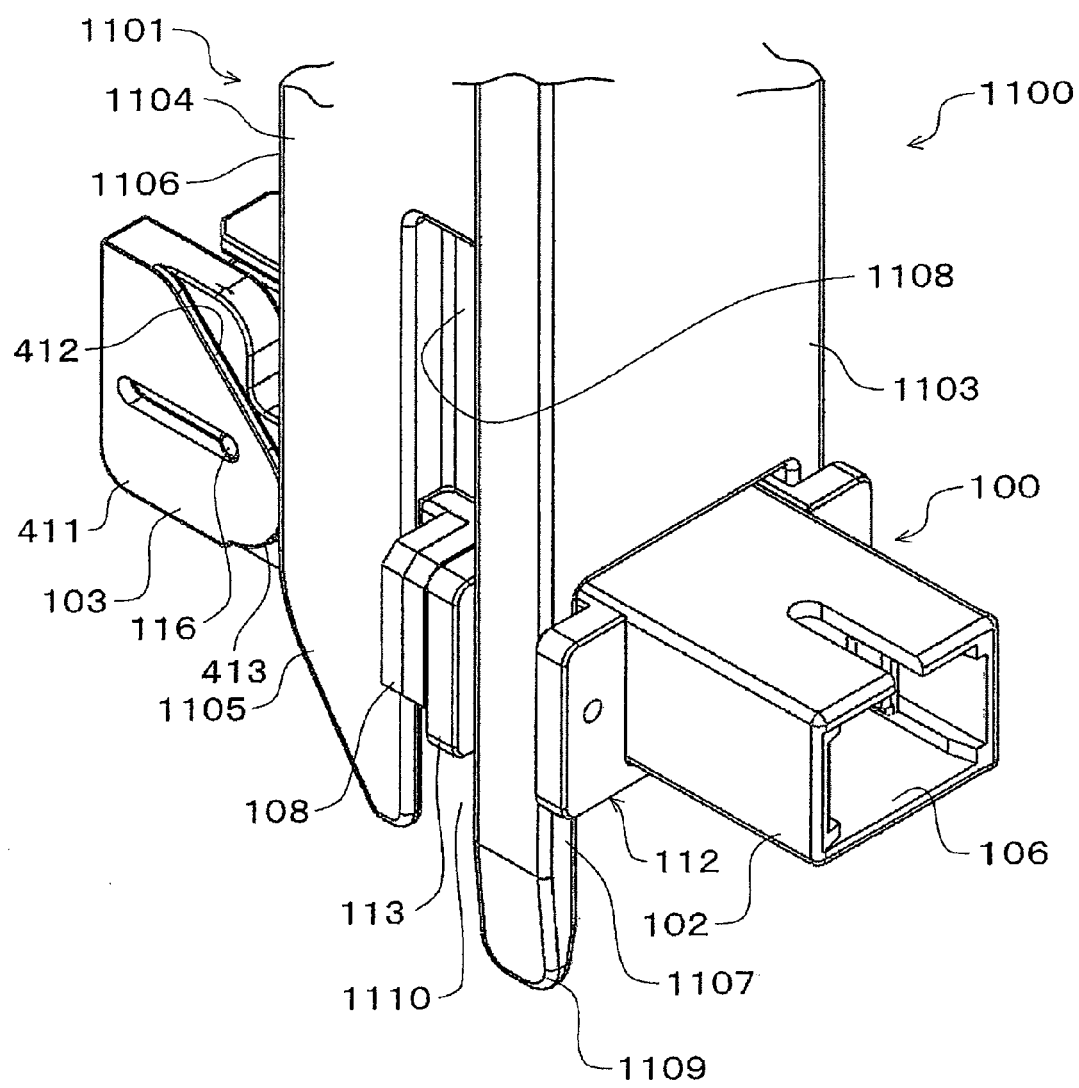
FIG. 12 is a perspective view showing the communication light detection structure of the invention after attaching the communication light detector.

As shown in FIGS. 11 and 12, a communication light detection structure 1100 in the preferred embodiment of the invention is provided with the communication light detection adapter 100 and the communication light detector 1101 removably attached to the communication light detection adapter 100.

Figure 13:
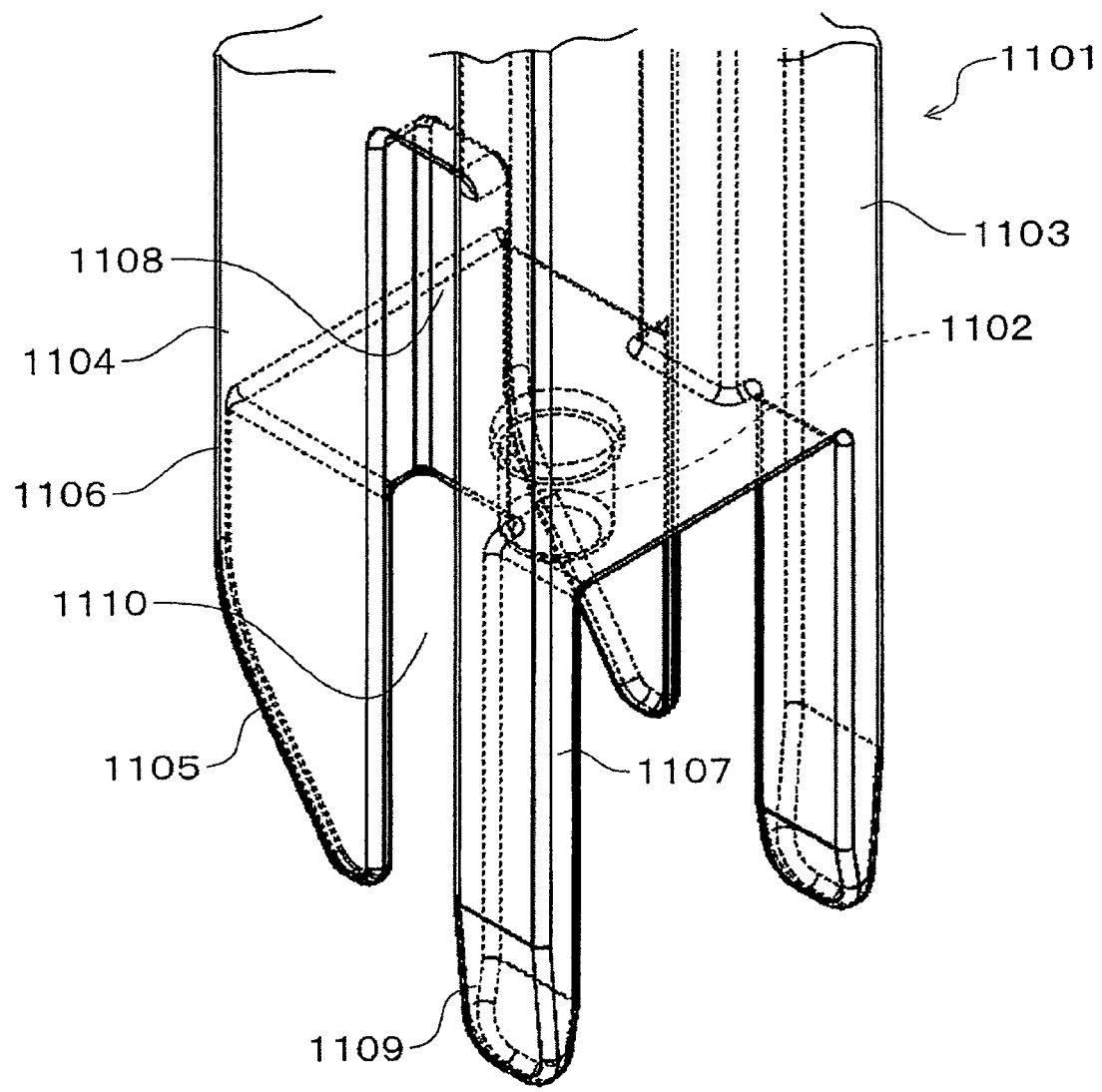
FIG. 13 is a partial perspective view showing the communication light detector of the communication light detection structure of the invention.

As shown in FIG. 13, the communication light detector 1101 has a detector main body 1103 having the light-receiving element 1102 to be housed in the light extraction hole 101 and the pressing legs 1104 formed on the detector main body 1103 to press the sliding lid 103 from the closed position toward the open position at the time of housing the light-receiving element 1102 in the light extraction hole 101.

The pressing leg 1104 has an inclined portion 1105 to slide the sliding lid 103 from the closed position toward the open position when the receiving portion 411 of the sliding lid 103 receives the pressing leg 1104.

The inclined portion 1105 preferably has a different inclination angle from the inclined portion 412 of the receiving portion 411. This reduces a contact area between the inclined portion 1105 of the pressing leg 1104 and the inclined portion 412 of the receiving portion 411 and thus allows a friction between the pressing leg 1104 and the receiving portion 411 to be reduced, resulting in that the sliding lid 103 can be easily slid by the pressing leg 1104.

When the pressing leg 1104 presses the receiving portion 411 of the sliding lid 103, the inclined portion 1105 firstly comes into contact with the arcuate portion 413 of the receiving portion 411 and a linear portion 1106 then comes into contact with the arcuate portion 413. Thus, the length of the pressing leg 1104 and an inclination angle of the inclined portion 1105 are adjusted so that the sliding lid 103 is arranged at the open position right before the linear portion 1106 comes into contact with the arcuate portion 413.

In addition, the communication light detector 1101 is further provided with the guide leg 1107 formed on the detector main body 1103 to align the light-receiving element 1102 with respect to the light extraction hole 101 when housing the light-receiving element 1102 in the light extraction hole 101, and a clearance groove 1108 formed on the detector main body 1103 to avoid mechanical interference between the communication light detector 1101 and the communication light detection adapter 100 when attaching the communication light detector 1101 to the communication light detection adapter 100.

The guide leg 1107 is inserted into the guide portion 114 of the communication light detection adapter 100 when attaching the communication light detector 1101 to the communication light detection adapter 100 and thus has functions of limiting the moving direction of the communication light detector 1101 to the vertical direction of the communication light detection adapter 100 and aligning the light-receiving element 1102 immediately above the light extraction hole 101. In addition, the guide leg 1107 has a thin portion 1109 having a thickness decreasing toward a tip for the purpose of facilitating insertion into the guide portion 114.

Furthermore, the guide leg 1107 is longer than the pressing leg 1104. This allows the pressing leg 1104 to press the sliding lid 103 after the guide leg 1107 is inserted into and positioned in the guide portion 114 when attaching the communication light detector 1101 to the vertical direction of the communication light detection adapter 100 and stability is thus improved.

The clearance groove 1108 is formed by extending a gap 1110 between the pressing leg 1104 and the guide leg 1107 across the detector main body 1103. Thus, as shown in FIGS. 11 and 12, mechanical interference of the detector main body 1103 with the two flange portions 108 of the adapter main body 102 and with one of the pair of wall portions 113 of the spacer 112 is avoided by the gap 1110 and the clearance groove 1108.

Figure 14:
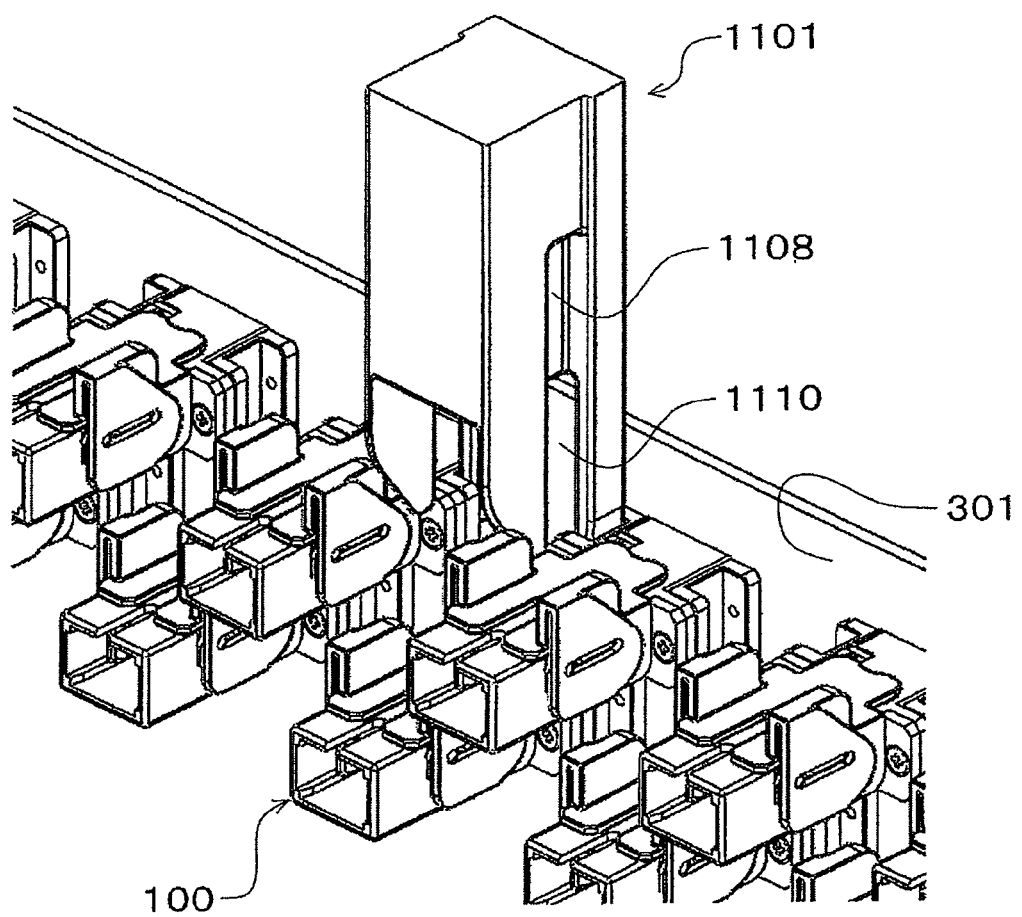
FIG. 14 is a perspective view showing the communication light detection structure of the invention before the communication light detector is attached to the multiple communication light detection adapters mounted on a rack panel.
Figure 15:
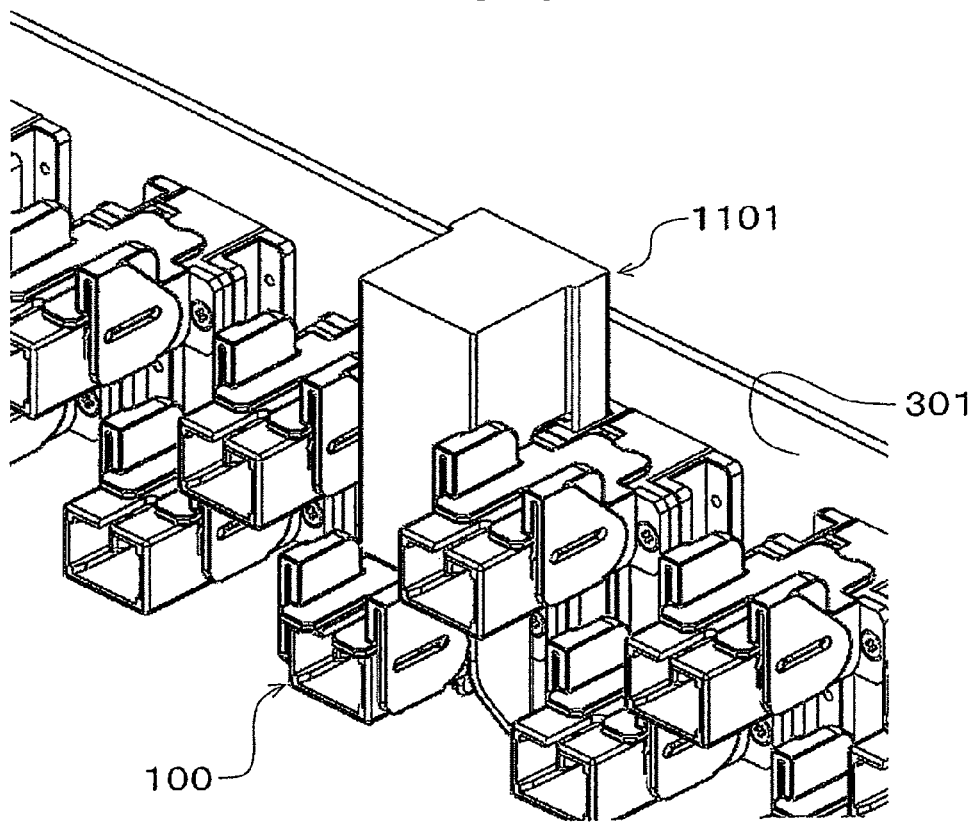
FIG. 15 is a perspective view showing the communication light detection structure of the invention after the communication light detector is attached to the multiple communication light detection adapters mounted on a rack panel.
Figure 16:
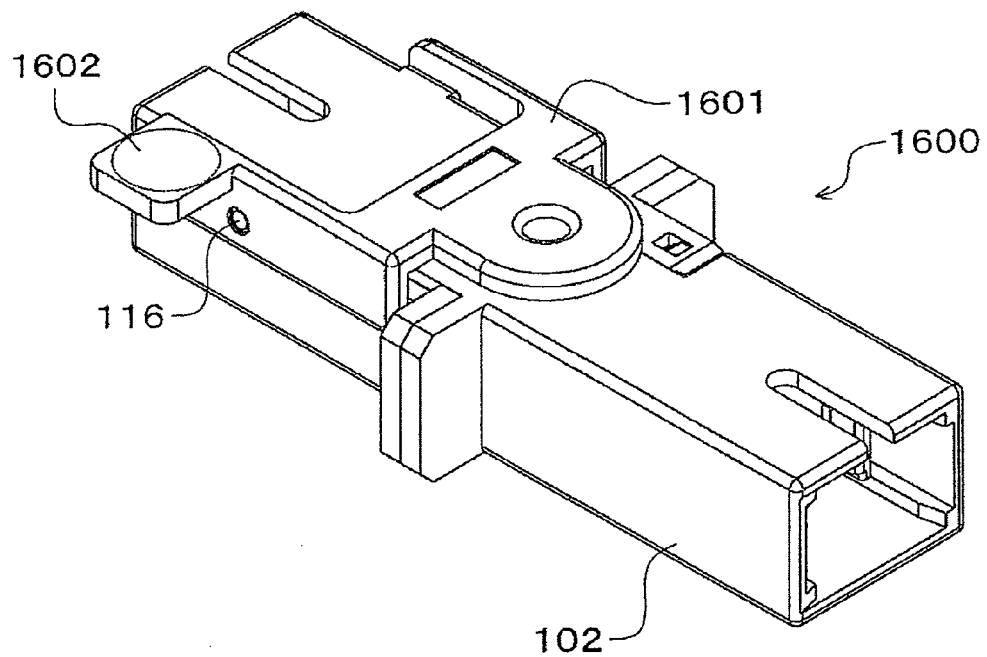
FIG. 16 is a perspective view showing a conventional communication light detection adapter in a state that a rotating lid member is arranged at the closed position.
Figure 17:
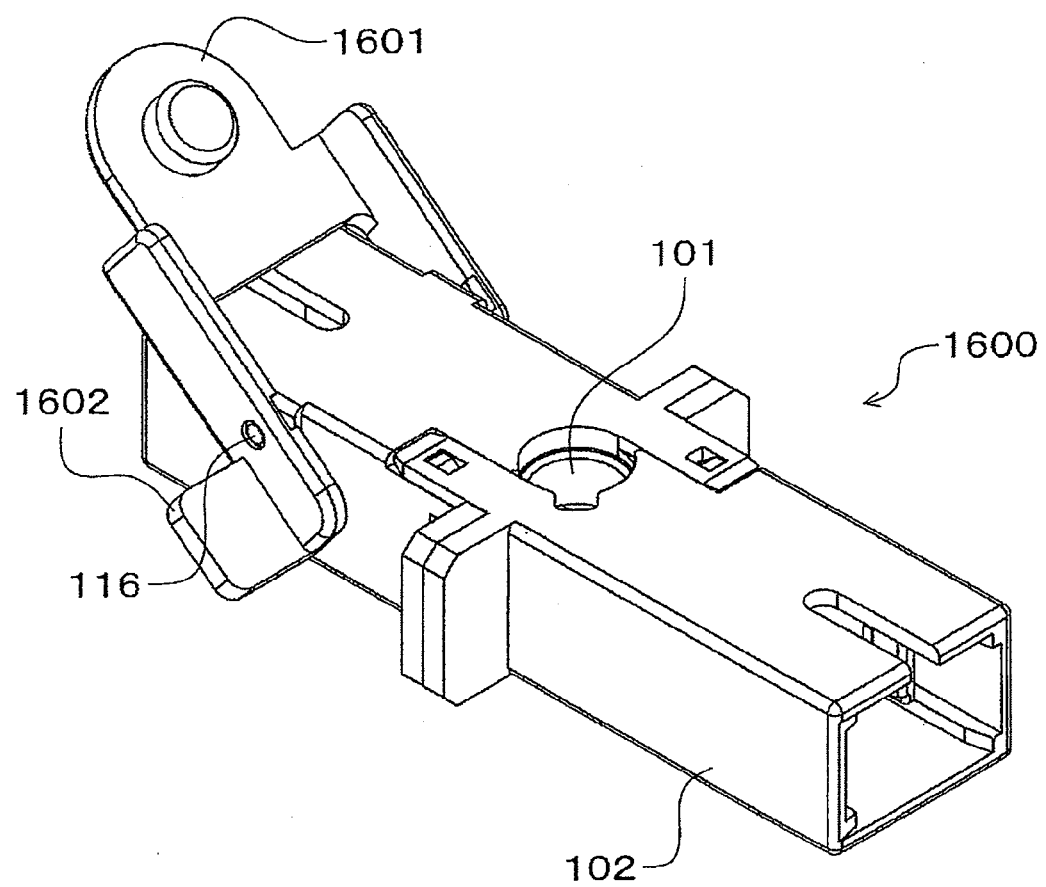
FIG. 17 is a perspective view showing the conventional communication light detection adapter in a state that the rotating lid member is arranged at the open position.

In addition, as shown in FIGS. 14 and 15, mechanical interference with other communication light detection adapters 100 mounted on the rack panel 301 is also avoided by the gap 1110 and the clearance groove 1108.

To ensure stability at the time of attaching the communication light detector 1101 to the communication light detection adapter 100, a pair of pressing legs 1104 and a pair of guide legs 1107 are formed so that each pair sandwiches the communication light detection adapter 100.

As described above, in the communication light detection structure 1100 of the preferred embodiment of the invention, the sliding lid 103 is automatically arranged at the open position since the pressing leg 1104 of the communication light detector 1101 presses the receiving portion 411 of the sliding lid 103 when attaching the communication light detector 1101 to the communication light detection adapter 100 and the sliding lid 103 is automatically arranged at the closed position by the energizing member 104 when detaching the communication light detector 1101 from the communication light detection adapter 100. Thus, the work sequence for checking the communication state of the optical transmission line is simplified and entrance of foreign bodies into the light extraction hole 101 due to a human error can be also prevented.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

What is claimed is:

1. A communication light detection adapter, comprising:
an adapter main body in which a light extraction hole is formed;
a sliding lid attached to the adapter main body so as to slide between a closed position to close the light extraction hole and an open position to open the light extraction hole; and
an energizing member to apply a pressure to the sliding lid in a direction from the open position toward the closed position,
wherein the adapter main body comprises a rectangular parallelepiped shape in which the light extraction hole is formed on an upper surface thereof,
wherein the sliding lid comprises a lid portion and a pair of housing portions,
wherein the lid portion is arranged in contact with the upper surface of the adapter main body to close or open the light extraction hole, and
wherein the pair of the housing portions are arranged on side surfaces of the adapter main body via a gap to sandwich the adapter main body and respectively to house the energizing member.

2. The communication light detection adapter according to claim 1,
wherein the sliding lid further comprises a horizontal rattling prevention portion formed on an inner surface of the housing portion and in contact with the side surface of the adapter main body to keep the gap constant.

3. The communication light detection adapter according to claim 1,
wherein the sliding lid comprises a vertical rattling prevention portion for maintaining contact between the lid portion and the upper surface of the adapter main body.

4. The communication light detection adapter according to claim 1,
wherein the sliding lid comprises a long-hole portion extending along a sliding direction, and wherein the adapter main body comprises a shaft to be engaged with the long-hole portion.

5. The communication light detection adapter according to claim 1,
wherein the energizing member comprises a coil formed by helically bending a wire rod and a pair of arms comprising both ends of the wire rod.

6. A communication light detection structure, comprising:
a communication light detection adapter; and a communication light detector removably attached to the communication light detection adapter,
wherein the communication light detection adapter comprises an adapter main body in which a light extraction hole is formed, a sliding lid attached to the adapter main body so as to slide between a closed position to close the light extraction hole and an open position to open the light extraction hole, and an energizing member to apply a pressure to the sliding lid in a direction from the open position toward the closed position, and
wherein the communication light detector comprises a detector main body comprising a light-receiving element to be housed in the light extraction hole and a pressing leg formed on the detector main body to press the sliding lid from the closed position toward the open position when housing the light-receiving element in the light extraction hole wherein the communication light detector further comprises a guide leg formed on the detector main body to align the light-receiving element with respect to the light extraction hole when housing the light-receiving element in the light extraction hole, and the communication light detection adapter further comprises a guide portion for receiving the guide leg.

7. The communication light detection structure according to claim 6, wherein the guide leg is longer than the pressing leg.

8. The communication light detection structure according to claim 6, wherein the adapter main body comprises a pair of divided portions, wherein the guide portion is provided on one of the divided portions, and wherein the sliding lid is provided on another of the divided portions.

9. The communication light detection structure according to claim 6, wherein the communication light detector further comprises a clearance groove formed on the detector main body to avoid mechanical interference between the communication light detector and other communication light detection adapters when attaching the communication light detector to the communication light detection adapter.

10. A communication light detection structure, comprising:

a communication light detection adapter; and a communication light detector removably attached to the communication light detection adapter, wherein the communication light detection adapter comprises an adapter main body in which a light extraction hole is formed, a sliding lid attached to the adapter main body so as to slide between a closed position to close the light extraction hole and an open position to open the light extraction hole, and an energizing member to apply a pressure to the sliding lid in a direction from the open position toward the closed position, and wherein the communication light detector comprises a detector main body comprising a light-receiving element to be housed in the light extraction hole and a pressing leg formed on the detector main body to press the sliding lid from the closed position toward the open position when housing the light-receiving element in the light extraction hole wherein the pressing leg and/or the receiving portion comprises an inclined portion to slide the sliding lid from the closed position toward the open position when the receiving portion receives the pressing leg, and wherein the sliding lid comprises a receiving portion for receiving the pressing leg.

* * * * *